US011118053B2

(12) United States Patent
Zhang et al.

(10) Patent No.: US 11,118,053 B2
(45) Date of Patent: Sep. 14, 2021

(54) POLYARYLETHERKETONE/POLYARYLENE SULFIDE COMPOSITION

(71) Applicant: Ticona LLC, Florence, KY (US)

(72) Inventors: Xiaowei Zhang, Union, KY (US); Suresh Subramonian, Cary, NC (US); Xinyu Zhao, Cincinnati, OH (US); Christopher McGrady, Walton, KY (US)

(73) Assignee: Ticona LLC, Florence, KY (US)

( * ) Notice: Subject to any disclaimer, the term of this patent is extended or adjusted under 35 U.S.C. 154(b) by 36 days.

(21) Appl. No.: 16/292,393

(22) Filed: Mar. 5, 2019

(65) Prior Publication Data

US 2019/0276667 A1 Sep. 12, 2019

Related U.S. Application Data

(60) Provisional application No. 62/640,772, filed on Mar. 9, 2018.

(51) Int. Cl.
| | |
|---|---|
| *C08L 71/12* | (2006.01) |
| *C08G 65/40* | (2006.01) |
| *C08J 5/04* | (2006.01) |
| *C08L 71/00* | (2006.01) |
| *B29K 309/08* | (2006.01) |
| *B29C 45/00* | (2006.01) |
| *B29K 71/00* | (2006.01) |

(52) U.S. Cl.
CPC ............ *C08L 71/123* (2013.01); *C08G 65/40* (2013.01); *C08J 5/043* (2013.01); *C08L 71/00* (2013.01); *B29C 45/0001* (2013.01); *B29K 2071/00* (2013.01); *B29K 2309/08* (2013.01); *C08J 2371/12* (2013.01); *C08J 2481/04* (2013.01); *C08L 2203/20* (2013.01)

(58) Field of Classification Search
None
See application file for complete search history.

(56) References Cited

U.S. PATENT DOCUMENTS

| | | |
|---|---|---|
| 3,956,240 A | 5/1976 | Dahl et al. |
| 4,320,224 A | 3/1982 | Rose et al. |
| 4,421,588 A | 12/1983 | Davies |
| 4,438,236 A | 3/1984 | Cogswell et al. |
| 4,528,346 A | 7/1985 | Sugie et al. |
| 4,657,990 A | 4/1987 | Daoust et al. |
| 4,684,699 A | 8/1987 | Robeson |
| 4,703,081 A | 10/1987 | Blackwell et al. |
| 4,816,556 A | 3/1989 | Gay et al. |
| 4,906,784 A | 3/1990 | Skoler |
| 4,970,284 A | 11/1990 | Staniland |
| 4,975,470 A | 12/1990 | Matzner et al. |
| 5,011,894 A | 4/1991 | Robeson et al. |
| 5,063,265 A | 11/1991 | Harris |
| 5,079,308 A | 1/1992 | Harris et al. |
| 5,079,309 A | 1/1992 | Harris et al. |
| 5,095,078 A | 3/1992 | Mizuno et al. |
| 5,100,973 A | 3/1992 | Robeson et al. |
| 5,110,880 A | 5/1992 | Harris et al. |
| 5,143,985 A | 9/1992 | Robeson et al. |
| 5,143,986 A | 9/1992 | Reuter et al. |
| 5,145,938 A | 9/1992 | Towle |
| 5,155,203 A | 10/1992 | Darnell et al. |
| 5,171,796 A | 12/1992 | Harris et al. |
| 5,288,834 A | 2/1994 | Roovers et al. |
| 5,290,906 A | 3/1994 | Matsumura et al. |
| 5,334,642 A | 8/1994 | Koch et al. |
| 5,436,310 A | 7/1995 | Dahl et al. |
| 5,504,139 A | 4/1996 | Davies et al. |
| 5,599,864 A | 2/1997 | Ogawa et al. |
| 5,654,393 A | 8/1997 | Kemmish et al. |
| 5,681,888 A | 10/1997 | Nomura et al. |
| 5,824,402 A | 10/1998 | Kemmish et al. |
| 6,194,524 B1 | 2/2001 | Nagashima et al. |
| 6,388,003 B1 | 5/2002 | Okamoto et al. |
| 6,566,484 B2 | 5/2003 | Gharda et al. |
| 6,881,816 B2 | 4/2005 | Gharda et al. |
| 7,151,138 B2 | 12/2006 | Nishihata et al. |
| 7,160,980 B2 | 1/2007 | Devine et al. |
| 7,173,090 B2 | 2/2007 | Akiyama et al. |
| 7,368,526 B2 | 5/2008 | Yuan et al. |
| 7,407,609 B2 | 8/2008 | Brown |
| 7,608,648 B2 | 10/2009 | Meakin et al. |
| 7,652,098 B2 | 1/2010 | Yamaguchi et al. |
| 7,745,538 B2 | 6/2010 | Seo et al. |
| 7,837,896 B2 | 11/2010 | Flath et al. |
| 7,875,234 B2 | 1/2011 | Richter et al. |
| 7,906,574 B2 | 3/2011 | Meakin et al. |
| 8,017,691 B2 | 9/2011 | Richter et al. |
| 8,088,306 B2 | 1/2012 | Kim et al. |
| 8,168,732 B2 | 5/2012 | Ajbani et al. |
| 8,299,159 B2 | 10/2012 | Chandrasekhar et al. |
| 8,324,308 B2 | 12/2012 | Kinouchi |
| 8,487,035 B2 | 7/2013 | Akiyama et al. |
| 8,487,042 B2 | 7/2013 | Okubo et al. |
| 8,536,265 B2 | 9/2013 | Meakin et al. |
| 8,575,298 B2 | 11/2013 | Ono et al. |
| 8,642,713 B2 | 2/2014 | Louis et al. |
| 8,648,155 B2 | 2/2014 | Ajbani et al. |
| 8,658,731 B2 | 2/2014 | Akiyama et al. |

(Continued)

FOREIGN PATENT DOCUMENTS

| | | |
|---|---|---|
| CN | 1073601 C | 10/2001 |
| CN | 101186695 A | 5/2008 |
| CN | 101302335 A | 11/2008 |
| CN | 101367994 A | 2/2009 |
| CN | 102250446 A | 11/2011 |

(Continued)

OTHER PUBLICATIONS

NPL Gharda Chemicals GATONE™ 5600 PEEK.*
U.S. Appl. No. 10/150,866, filed Dec. 11, 2018, Brule et al.
International Search Report and Written Opinion for PCT/US2019/020881 dated May 24, 2019, 13 pages.

*Primary Examiner* — Robert T Butcher
(74) *Attorney, Agent, or Firm* — Dority & Manning, P.A.

(57) ABSTRACT

A polymer composition comprising at least one polyaryletherketone, at least one polyarylene sulfide, and a plurality of reinforcing fibers is provided. The composition has a melt viscosity of about 250 Pa-s or less as determined in accordance with ISO Test No. 11443:2005 at a shear rate of 1,000 seconds$^{-1}$ and temperature of about 380° C.

25 Claims, No Drawings

(56) References Cited

U.S. PATENT DOCUMENTS

| | | |
|---|---|---|
| 8,664,322 B2 | 3/2014 | Lee et al. |
| 8,729,150 B2 | 5/2014 | Jarman-Smith et al. |
| 8,735,510 B2 | 5/2014 | Moore et al. |
| 8,741,998 B2 | 6/2014 | I'Abee et al. |
| 8,754,162 B2 | 6/2014 | Maljkovic et al. |
| 8,813,332 B2 | 8/2014 | Leibfried et al. |
| 8,865,281 B2 | 10/2014 | Axelrad et al. |
| 8,969,504 B2 | 3/2015 | Louis et al. |
| 8,993,670 B2 | 3/2015 | Fujii et al. |
| 9,000,087 B2 | 4/2015 | El-Hibri et al. |
| 9,006,306 B2 | 4/2015 | La Camera et al. |
| 9,045,631 B2 | 6/2015 | Kumazawa et al. |
| 9,062,163 B2 | 6/2015 | Wang et al. |
| 9,080,039 B2 | 7/2015 | Shin et al. |
| 9,085,690 B2 | 7/2015 | Ito et al. |
| 9,102,792 B2 | 8/2015 | Nair et al. |
| 9,145,499 B2 | 9/2015 | El-Hibri et al. |
| 9,243,101 B2 | 1/2016 | Meakin et al. |
| 9,249,903 B2 | 2/2016 | Wood et al. |
| 9,512,312 B2 | 12/2016 | Mazahir et al. |
| 9,624,371 B2 | 4/2017 | Brule et al. |
| 9,765,176 B2 | 9/2017 | Taylor et al. |
| 9,783,636 B2 | 10/2017 | Chaplin et al. |
| 9,840,609 B2 | 12/2017 | Lee et al. |
| 9,988,529 B2 | 6/2018 | Lu et al. |
| 10,023,691 B2 | 7/2018 | Capra et al. |
| 10,107,421 B2 | 10/2018 | Wood et al. |
| 10,125,257 B2 | 11/2018 | Wood |
| 10,156,303 B2 | 12/2018 | Feng et al. |
| 10,166,727 B2 | 1/2019 | Chaplin et al. |
| 2003/0181560 A1 | 9/2003 | Kawaguchi et al. |
| 2005/0100724 A1 | 5/2005 | Seargeant |
| 2008/0258337 A1* | 10/2008 | Ajbani .................. C08L 81/02 264/241 |
| 2008/0312387 A1 | 12/2008 | El-Hibri et al. |
| 2009/0069511 A1 | 3/2009 | Thomas et al. |
| 2009/0092827 A1 | 4/2009 | Robinson |
| 2009/0131582 A1 | 5/2009 | Grant et al. |
| 2010/0024695 A1 | 2/2010 | Difrancia et al. |
| 2011/0003163 A1 | 1/2011 | Wood |
| 2011/0212290 A1 | 9/2011 | Crawley et al. |
| 2011/0287272 A1 | 11/2011 | Elia |
| 2012/0101185 A1 | 4/2012 | Valentine et al. |
| 2012/0160829 A1 | 6/2012 | Dufaure et al. |
| 2013/0025734 A1 | 1/2013 | Kuhmann et al. |
| 2013/0032240 A1 | 2/2013 | Kuhmann et al. |
| 2013/0207029 A1 | 8/2013 | Janssen et al. |
| 2013/0331500 A1 | 12/2013 | Yokoe et al. |
| 2014/0001415 A1 | 1/2014 | Sheng et al. |
| 2014/0128566 A1 | 5/2014 | Grant et al. |
| 2014/0200466 A1 | 7/2014 | Sereno et al. |
| 2014/0322441 A1 | 10/2014 | Mathieu et al. |
| 2015/0252189 A1 | 9/2015 | Wang et al. |
| 2015/0274961 A1 | 10/2015 | Ito et al. |
| 2016/0033058 A1 | 2/2016 | Wood et al. |
| 2016/0053042 A1 | 2/2016 | Aizpurua Iparraguirre et al. |
| 2016/0053117 A1 | 2/2016 | Nair et al. |
| 2016/0053118 A1 | 2/2016 | Nair et al. |
| 2016/0122510 A1* | 5/2016 | Verfaillie .................. C08K 7/14 524/492 |
| 2016/0152769 A1 | 6/2016 | Wilson et al. |
| 2016/0208045 A1 | 7/2016 | Slater et al. |
| 2016/0208081 A1 | 7/2016 | Peng et al. |
| 2016/0304667 A1 | 10/2016 | Chaplin et al. |
| 2017/0029991 A1 | 2/2017 | Chandrasekaran et al. |
| 2017/0044348 A1 | 2/2017 | Yamagawa et al. |
| 2017/0129225 A1 | 5/2017 | Green et al. |
| 2017/0197393 A1 | 7/2017 | Crawley et al. |
| 2017/0218199 A1 | 8/2017 | Chaplin et al. |
| 2017/0240727 A1 | 8/2017 | Van Der Burgt et al. |
| 2017/0267838 A1 | 9/2017 | Lu et al. |
| 2017/0275454 A1 | 9/2017 | Mazahir et al. |
| 2017/0301430 A1 | 10/2017 | Iida et al. |
| 2017/0342227 A1 | 11/2017 | Percy |
| 2018/0044470 A1 | 2/2018 | Small et al. |
| 2018/0208740 A1 | 7/2018 | Matthews et al. |
| 2018/0265697 A1 | 9/2018 | Ainsworth et al. |
| 2018/0282542 A1 | 10/2018 | Chaplin et al. |

FOREIGN PATENT DOCUMENTS

| | | |
|---|---|---|
| CN | 102321338 A | 1/2012 |
| CN | 102337019 A | 2/2012 |
| CN | 102344662 A | 2/2012 |
| CN | 102775726 A | 11/2012 |
| CN | 102827455 A | 12/2012 |
| CN | 102898808 A | 1/2013 |
| CN | 103214788 A | 7/2013 |
| CN | 103242641 A | 8/2013 |
| CN | 103319876 A | 9/2013 |
| CN | 103374216 A | 10/2013 |
| CN | 103509342 A | 1/2014 |
| CN | 103509343 A | 1/2014 |
| CN | 103740088 A | 4/2014 |
| CN | 104650584 A | 5/2015 |
| CN | 104774524 A | 7/2015 |
| CN | 104788897 A | 7/2015 |
| CN | 104844775 A | 8/2015 |
| CN | 104945800 A | 9/2015 |
| CN | 104987659 A | 10/2015 |
| CN | 105086451 A | 11/2015 |
| CN | 105419225 A | 3/2016 |
| CN | 106243621 A | 12/2016 |
| CN | 107022167 A | 8/2017 |
| DE | 4140499 A1 | 6/1993 |
| EP | 0 102 158 B1 | 1/1988 |
| EP | 0 246 620 B1 | 2/1992 |
| EP | 0 376 616 B1 | 11/1995 |
| EP | 2 981 573 B1 | 6/2018 |
| GB | 2 237 810 A | 5/1991 |
| GB | 2 425 495 A | 11/2006 |
| JP | S 59113055 A | 6/1984 |
| JP | S 61162549 A | 7/1986 |
| JP | S 63205358 A | 8/1988 |
| JP | H 01282252 A | 11/1989 |
| JP | H 01282253 A | 11/1989 |
| JP | H 01282254 A | 11/1989 |
| JP | H 02251562 A | 10/1990 |
| JP | H 0462109 A | 2/1992 |
| JP | H 04220425 A | 8/1992 |
| JP | H 04283231 A | 10/1992 |
| JP | H 05192985 A | 8/1993 |
| JP | H 069774 A | 1/1994 |
| JP | H 10219026 A | 8/1998 |
| JP | 2001234053 A | 8/2001 |
| JP | 2002284980 A | 10/2002 |
| JP | 2005133047 A | 5/2005 |
| JP | 2005161693 A | 6/2005 |
| JP | 2008001744 A | 1/2008 |
| JP | 2008260830 A | 10/2008 |
| JP | 2009161748 A | 7/2009 |
| JP | 2010043229 A | 2/2010 |
| JP | 2010095613 A | 4/2010 |
| JP | 4633384 B | 2/2011 |
| JP | 2011026439 A | 2/2011 |
| JP | 4912620 B | 4/2012 |
| JP | 5523520 B | 6/2014 |
| JP | 5540778 B | 7/2014 |
| JP | 2016160396 A | 9/2016 |
| JP | 6056504 B | 1/2017 |
| KR | 20110079103 A | 7/2011 |
| KR | 101192372 B | 10/2012 |
| RU | 2556223 C | 7/2015 |
| WO | WO 2008/038512 A1 | 4/2008 |
| WO | WO 2008/135545 A1 | 11/2008 |
| WO | WO 2010/084845 A1 | 7/2010 |
| WO | WO 2014/096999 A1 | 6/2014 |
| WO | WO 2014/103814 A1 | 7/2014 |
| WO | WO 2017/186926 A1 | 11/2017 |
| WO | WO 2018/024744 A1 | 2/2018 |

* cited by examiner

POLYARYLETHERKETONE/POLYARYLENE SULFIDE COMPOSITION

RELATED APPLICATION

The present application claims priority to U.S. application Ser. No. 62/640,772 (filed on Mar. 9, 2018), which is incorporated herein in its entirety by reference thereto.

BACKGROUND OF THE INVENTION

Polyetheretherketone ("PEEK") is often used to fabricate parts for numerous engineering applications. Each application requires particular tensile and flexural properties, impact strength, heat distortion temperature, and resistance to warp. PEEK polymers are characterized by a high glass transition temperature, typically above 100° C., which makes them suitable for use in applications that require exposure to high temperatures. One drawback to these materials, however, is that they exhibit poor melt flow properties, which makes processing difficult. As such, a need continues to exist for high performance polymers with excellent melt flow properties.

SUMMARY OF THE INVENTION

In accordance with one embodiment of the present invention, a polymer composition is disclosed that comprises at least one polyaryletherketone, at least one polyarylene sulfide, and a plurality of reinforcing fibers. The composition has a melt viscosity of about 250 Pa-s or less as determined in accordance with ISO Test No. 11443:2005 at a shear rate of 1,000 seconds$^{-1}$ and temperature of about 380° C.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a polymer composition that contains a blend of a polyaryletherketone and a polyarylene sulfide in combination with a plurality of reinforcing fibers. Through selective control over the particular nature and concentration of these components, the present inventors have discovered that the resulting composition can have a lower "high" shear melt viscosity, which enables the composition to exhibit better flow properties for use in a wide variety of applications. The high shear melt viscosity may, for instance, be reduced so that the ratio of the melt viscosity of the polymer composition to the initial melt viscosity of the polyaryletherketone may be about 0.98 or less, in some embodiments about 0.95 or less, in some embodiments, from about 0.01 to about 0.90, in some embodiments from about 0.02 to about 0.85, and in some embodiments, from about 0.05 to about 0.50. In one particular embodiment, the polymer composition may have a melt viscosity of about 250 Pa-s or less, in some embodiments from about 0.5 to about 220 Pa-s, and in some embodiments, from about 1 to about 200 Pa-s, as determined in accordance with ISO Test No. 11443:2005 at a shear rate of 1,000 seconds$^{-1}$ and temperature at least 15° C. above the melting temperature (e.g., about 380° C.). Among other things, these viscosity properties can allow the composition to be readily injection molded into parts having very small dimensions.

Conventionally, it was believed that polymer compositions having such high flow properties would not also possess sufficiently good mechanical properties to enable their use in certain types of applications. Contrary to conventional thought, however, the present inventors have surprisingly found that the resulting composition can exhibit good mechanical properties. For example, the composition may exhibit a Charpy notched impact strength of about 3 kJ/m$^2$ or more, in some embodiments from about 4 to about 50 kJ/m$^2$, and in some embodiments, from about 5 to about 30 kJ/m$^2$, measured at 23° C. according to ISO Test No. 179-1:2010 (technically equivalent to ASTM D256, Method B). The tensile and flexural mechanical properties are also good. For example, the polymer composition may exhibit a tensile strength of about 50 MPa or more, in some embodiments about 80 MPa or more, and in some embodiments, from about 100 to about 400 MPa; a tensile break strain of about 0.5% or more, in some embodiments from about 0.6% to about 10%, and in some embodiments, from about 0.8% to about 3.5%; and/or a tensile modulus of about 6,000 MPa or more, in some embodiments about 8,000 MPa or more, and in some embodiments, from about 10,000 MPa to about 20,000 MPa. The tensile properties may be determined in accordance with ISO Test No. 527:2012 (technically equivalent to ASTM D638-14) at 23° C. The composition may also exhibit a flexural strength of about 180 MPa or more, in some embodiments about 200 MPa or more, and in some embodiments, from about 220 MPa to about 500 MPa; a flexural strain of about 0.5% or more, in some embodiments from about 0.6% to about 10%, and in some embodiments, from about 0.8% to about 3.5%; and/or a flexural modulus of about 6,000 MPa or more, in some embodiments about 8,000 MPa or more, and in some embodiments, from about 10,000 MPa to about 25,000 MPa. The flexural properties may be determined in accordance with ISO Test No. 178:2010 (technically equivalent to ASTM D790-10) at 23° C. The polymer composition may also exhibit a deflection temperature under load (DTUL) of about 250° C. or more, and in some embodiments, from about 280° C. to about 350° C., as measured according to ASTM D648-07 (technically equivalent to ISO Test No. 75-2:2013) at a specified load of 1.8 MPa.

Furthermore, the polymer composition is hydrolytically stable in that its mechanical properties may be substantially maintained even after exposure to aqueous solutions at a high temperature. For example, the polymer composition may be submerged in an aqueous solution at a temperature of about 80° C. or more, and in some embodiments, from about 100° C. to about 200° C. (e.g., 150° C.). The aqueous solution may contain, for instance, at least about 20% by volume of water. This may be accomplished, for instance, by placing the composition in a vessel containing an aqueous solution that is heated to the desired temperature. Even at such high temperatures, the mechanical properties (e.g., impact strength, tensile properties, and/or flexural properties) can remain stable at such temperatures for a substantial period of time, such as for about 100 hours or more, in some embodiments from about 300 hours to about 3,000 hours, and in some embodiments, from about 400 hours to about 2,500 hours (e.g., 500 hours, 1,000 hours, 1,500 hours, or 2,000 hours). In one embodiment, for example, the ratio of a particular mechanical property (e.g., tensile strength) after being submerged in the heated aqueous solution (e.g., 150° C., 20% by volume of water) for 2,000 hours to the same mechanical property before being exposed to the heated aqueous solution is about 0.5 or more, in some embodiments about 0.6 or more, and in some embodiments, from about 0.65 to about 0.95.

In addition to possessing good mechanical properties, the present inventors have also discovered that the composition has improved flame resistance performance, even in the absence of conventional flame retardants. The flame resistance of the composition may, for instance, be determined in accordance the procedure of Underwriter's Laboratory Bulletin 94 entitled "Tests for Flammability of Plastic Materials, UL94". Several ratings can be applied based on the time to extinguish (total flame time) and ability to resist dripping as described in more detail below. According to this procedure, for example, a molded part formed from the composition of the present invention may achieve a V0 rating, which means that the part has a total flame time of 50 seconds or less and a total number of drips of burning particles that ignite cotton of 0, determined at a given part thickness (e.g., 0.25 mm, 0.4 mm, 0.8 mm, or 1.6 mm). For example, when exposed to an open flame, a molded part formed from the composition of the present invention may exhibit a total flame time of about 50 seconds or less, in some embodiments about 45 seconds or less, and in some embodiments, from about 1 to about 40 seconds. Furthermore, the total number of drips of burning particles produced during the UL94 test may be 3 or less, in some embodiments 2 or less, and in some embodiments, 1 or less (e.g., 0). Such testing may be performed after conditioning for 48 hours at 23° C. and 50% relative humidity.

Various embodiments of the present invention will now be described in more detail.

I. Polymer Composition

A. Polyaryletherketone

Polyaryletherketones are semi-crystalline polymers with a relatively high melting temperature, such as from about 300° C. to about 400° C., in some embodiments from about 310° C. to about 390° C., and in some embodiments, from about 330° C. to about 380° C. The glass transition temperature may likewise be about 100° C. or more, in some embodiments from about 110° C. to about 200° C., and in some embodiments, from about 130° C. to about 160° C. The melting and glass transition temperatures may be determined as is well known in the art using differential scanning calorimetry ("DSC"), such as determined by ISO Test No. 11357-1:2016. Prior to combination with the polyarylene sulfide, the initial polyaryletherketone may have a relatively high melt viscosity. In one particular embodiment, for example, the polyaryletherketone may have a melt viscosity of about 120 Pa-s or more, in some embodiments from about 1250 to about 250 Pa-s, and in some embodiments, from about 130 to about 200 Pa-s, determined at a shear rate of 1,000 seconds$^{-1}$ and at a temperature of about 400° C. in accordance with ISO Test No. 11443:2005.

Polyaryletherketones typically contain a moiety having the structure of Formula (I) and/or Formula (II):

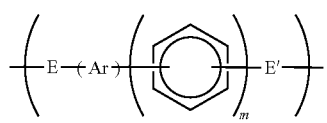
(I)

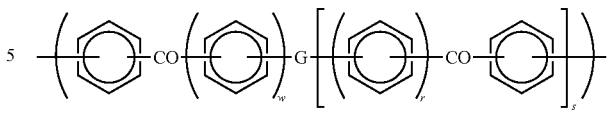
(II)

wherein, m and r are independently zero or a positive integer, in some embodiments from 0 to 3, in some embodiments from 0 to 2, and in some embodiments, 0 or 1;

s and w are independently zero or a positive integer, in some embodiments from 0 to 2, and in some embodiments, 0 or 1;

E and E' are independently an oxygen atom or a direct link;

G is an oxygen atom, a direct link, or —O-Ph-O— where Ph is a phenyl group; and

Ar is one of the following moieties (i) to (vi), which is bonded via one or more of phenyl moieties to adjacent moieties:

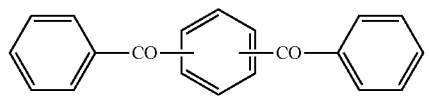
(i)

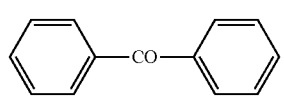
(ii)

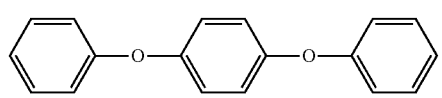
(iii)

(iv)

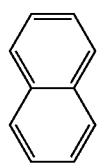
(v)

(vi)

The polyaryletherketone may include more than one different type of repeat unit of Formula (I) and/or more than one different type of repeat unit of Formula (II). Typically, however, only one type of repeat unit of Formula (I) or Formula (II) is provided. In one particular embodiment, for example, the polyaryletherketone is a homopolymer or copolymer containing a repeat unit of the following general Formula (III):

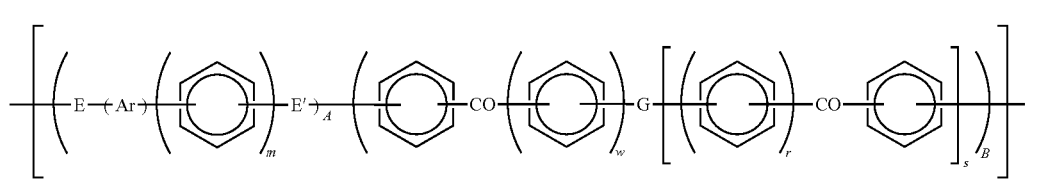

wherein,
A and B are independently 0 or 1; and
E, E', G, Ar, m, r, s and w are as described above.

In yet another embodiment, the polyaryletherketone is a homopolymer or copolymer containing a repeat unit of the following general Formula (IV):

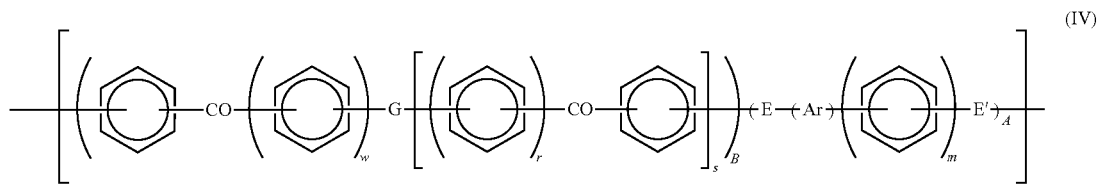

wherein,
A and B are independently 0 or 1; and
E, E', G, Ar, m, r, s and w are as described above.

Desirably, Ar in the embodiments above is selected from the following moieties (vii) to (xiii):

(vii)
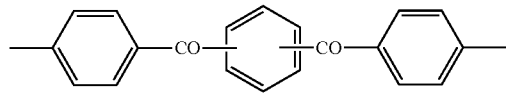

(viii)
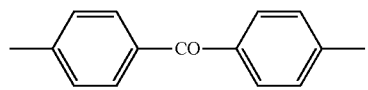

(ix)

(x)
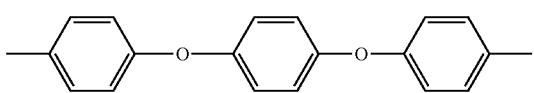

(xi)
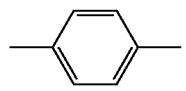

(xii)
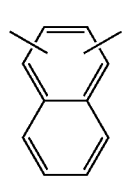

-continued (xiii)
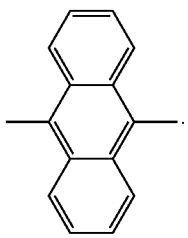

Particularly suitable polyaryletherketone polymers (or copolymers) are those of Formula (III) that primarily include phenyl moieties in conjunction with ketone and/or ether moieties. Examples of such polymers include polyetheretherketone ("PEEK") (wherein in Formula (III), Ar is moiety (iv), E and E' are oxygen atoms, m is 0, w is 1, G is a direct link, s is 0, and A and B are 1); polyetherketone ("PEK") (wherein in Formula (III), E is an oxygen atom, E' is a direct link, Ar is moiety (i), m is 0, A is 1, B is 0); polyetherketoneketone ("PEKK") (wherein in Formula (III), E is an oxygen atom, Ar is moiety (i), m is 0, E' is a direct link, A is 1, and B is 0); polyetherketoneetherketoneketone ("PEKEKK") (wherein in Formula (III), Ar is moiety (i), E and E' are oxygen atoms, G is a direct link, m is 0, w is 1, r is 0, s is 1, and A and B are 1); polyetheretherketoneketone ("PEEKK") (wherein in Formula (III), Ar is moiety (iv), E and E' are oxygen atoms, G is a direct link, m is 0, w is 0, and s, r, A and B are 1); polyether-diphenyl-ether-ether-diphenyl-ether-phenyl-ketone-phenyl (wherein in Formula (III), Ar is moiety (iv), E and E' are oxygen atoms, m is 1, w is 1, A is 1, B is 1, r and s are 0, and G is a direct link); as well as blends and copolymers thereof.

B. Polyarylene Sulfide

The polyarylene sulfide(s) generally have repeating units of the formula:

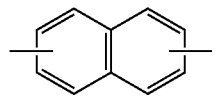

wherein, $Ar^1$, $Ar^2$, $Ar^3$, and $Ar^4$ are independently arylene units of 6 to 18 carbon atoms;

W, X, Y, and Z are independently bivalent linking groups selected from —SO$_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —(C$_6$H$_4$—S)$_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide. The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihalo-aromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

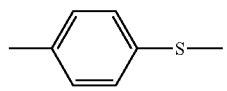

and segments having the structure of formula:

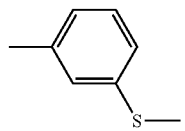

or segments having the structure of formula:

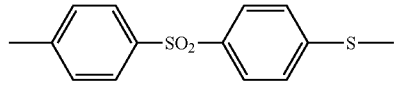

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula R'X$_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

Prior to combination with the polyaryletherketone, the initial polyarylene sulfide may have a relatively low melt viscosity. In one particular embodiment, for example, the polyarylene sulfide may have a melt viscosity of about 150 Pa-s or less, in some embodiments from about 5 to about 130 Pa-s, and in some embodiments, from about 10 to about 100 Pa-s, as determined in accordance with ISO Test No. 11443: 2005 at a shear rate of 1,200 seconds$^{-1}$ and temperature at least 15° C. above the melting temperature (e.g., about 310° C.).

The relative proportion of polyaryletherketone(s) and polyarylene sulfide(s) in the composition may also be selected to help achieve the desired balance between viscosity and mechanical properties. More particularly, a high concentration of polyarylene sulfides can result in a low melt viscosity, but too high of a content may reduce the viscosity to such an extent that it adversely impacts strength. In most embodiments, for example, polyarylene sulfide(s) may be employed in an amount of from about 1 to about 60 parts, in some embodiments from about 2 to about 50 parts, and in some embodiments, from about 5 to about 30 parts by weight relative to 100 parts by weight of the polyaryletherketone(s). The polyarylene sulfide(s) may also constitute from about 0.5 wt. % to about 40 wt. %, in some embodiments from about 1 wt. % to about 30 wt. %, and in some embodiments, from about 2 wt. % to about 15 wt. % of the polymer composition. Polyaryletherketones may likewise constitute from about 40 wt. % to about 80 wt. %, in some embodiments from about 45 wt. % to about 75 wt. %, and in some embodiments, from about 50 wt. % to about 70 wt. % of the polymer composition.

C. Reinforcing Fibers

Any of a variety of different types of reinforcing fibers may generally be employed in the polymer composition of the present invention, such as polymer fibers, metal fibers, carbonaceous fibers (e.g., graphite, carbide, etc.), inorganic fibers, etc., as well as combinations thereof. Inorganic fibers may be particularly suitable, such as those that are derived from glass; titanates (e.g., potassium titanate); silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Glass fibers may be particularly suitable for use in the present invention, such as those formed from E-glass, A-glass, C-glass, D-glass, AR-glass, R-glass, S1-glass, S2-glass, etc., as well as mixtures thereof. If desired, the reinforcing fibers may be provided with a sizing agent or other coating as is known in the art. Regardless of the particular type selected, the fibers may have a relatively low elastic modulus to enhance the processability of the resulting polymer composition. The fibers may, for instance, have a Young's modulus of elasticity of less than about 76 GPa, in some embodiments less than about 75 GPa, and in some embodiments, from about 10 to about 74 GPa, as determined in accordance with ASTM C1557-14.

The cross-sectional area of the fibers may vary as desired. In some embodiments, for example, the fibers may be generally symmetrical in nature (e.g., square, circular, etc.) such that the aspect ratio of from about 0.8 to about 10, in some embodiments from about 2 to about 8, and in some embodiments, from about 3 to about 5. The aspect ratio is determined by dividing the cross-sectional width of the fibers (i.e., in the direction of the major axis) by the cross-sectional thickness of the fibers (i.e., in the direction of the minor axis). In other embodiments, however, it may be desirable to use fibers that have a relatively flat cross-sectional dimension in that they have an aspect ratio of from about 1.5 to about 10, in some embodiments from about 2 to about 8, and in some embodiments, from about 3 to about 5. The shape of such fibers may be in the form of an ellipse, rectangle, rectangle with one or more rounded corners, etc. Regardless of the particular shape, the cross-sectional width of the fibers may be from about 1 to about 50 micrometers, in some embodiments from about 5 to about 45 micrometers, and in some embodiments, from about 10 to about 35 micrometers. The fibers may also have a thickness of from about 0.5 to about 30 micrometers, in some embodiments from about 1 to about 20 micrometers, and in some embodiments, from about 3 to about 15 micrometers. It should be understood that the cross-sectional thickness and/or width need not be uniform over the entire cross-section. In such circumstances, the cross-sectional width is considered as the largest dimension along the major axis of the fiber and the cross-sectional thickness is considered as the largest dimension along the minor axis. For example, the cross-sectional thickness for an elliptical fiber is the minor diameter of the ellipse.

The reinforcing fibers may also have a narrow size distribution. That is, at least about 60% by volume of the fibers, in some embodiments at least about 70% by volume of the fibers, and in some embodiments, at least about 80% by volume of the fibers may have a width and/or thickness within the ranges noted above. The fibers may be endless or chopped fibers, such as those having a length of from about 1 to about 15 millimeters, and in some embodiments, from about 2 to about 6 millimeters. The dimension of the fibers (e.g., length, width, and thickness) may be determined using known optical microscopy techniques.

The amount of reinforcing fibers may be selectively controlled to achieve the desired combination of high flow and good mechanical properties. The reinforcing fibers may, for example, be employed in an amount of from about 20 to about 80 parts, in some embodiments from about 30 to about 70 parts, and in some embodiments, from about 40 to about 60 parts per 100 parts by weight of polyaryletherketone(s) employed in the polymer composition. The reinforcing fibers may, for instance, constitute from about 5 wt. % to about 60 wt. %, in some embodiments from about 10 wt. % to about 50 wt. %, and in some embodiments, from about 20 wt. % to about 40 wt. % of the polymer composition.

D. Other Components

In addition to a polyaryletherketone, polyarylene sulfide, and reinforcing fibers, other components may also be employed in the polymer composition. In one embodiment, for instance, the polymer composition may contain an organosilane compound. Such organosilane compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The organosilane compound may, for example, be any alkoxysilane as is known in the art, such as vinylalkoxysilanes, epoxyalkoxysilanes, aminoalkoxysilanes, mercaptoalkoxysilanes, and combinations thereof. In one embodiment, for instance, the organosilane compound may have the following general formula:

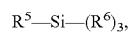

wherein, $R^5$ is a sulfide group (e.g., —SH), an alkyl sulfide containing from 1 to 10 carbon atoms (e.g., mercaptopropyl, mercaptoethyl, mercaptobutyl, etc.), alkenyl sulfide containing from 2 to 10 carbon atoms, alkynyl sulfide containing from 2 to 10 carbon atoms, amino group (e.g., NH$_2$), aminoalkyl containing from 1 to 10 carbon atoms (e.g., aminomethyl, aminoethyl, aminopropyl, aminobutyl, etc.); aminoalkenyl containing from 2 to 10 carbon atoms, aminoalkynyl containing from 2 to 10 carbon atoms, and so forth;

R$^6$ is an alkoxy group of from 1 to 10 carbon atoms, such as methoxy, ethoxy, propoxy, and so forth.

Some representative examples of organosilane compounds that may be included in the mixture include mercaptopropyl trimethyoxysilane, mercaptopropyl triethoxysilane, aminopropyl triethoxysilane, aminoethyl triethoxysilane, am inopropyl trimethoxysilane, am inoethyl trimethoxysilane, ethylene trimethoxysilane, ethylene triethoxysilane, ethyne trimethoxysilane, ethyne triethoxysilane, aminoethylaminopropyltrimethoxysilane, 3-aminopropyl triethoxysilane, 3-aminopropyl trimethoxysilane, 3-aminopropyl methyl dimethoxysilane or 3-aminopropyl methyl diethoxysilane, N-(2-aminoethyl)-3-aminopropyl trimethoxysilane, N-methyl-3-aminopropyl trimethoxysilane, N-phenyl-3-aminopropyl trimethoxysilane, bis(3-aminopropyl) tetramethoxysilane, bis(3-aminopropyl) tetraethoxy disiloxane, γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane, γ-diallylaminopropyltrimethoxysilane, etc., as well as combinations thereof. Particularly suitable organosilane compounds are 3-aminopropyltriethoxysilane and 3-mercaptopropyltrimethoxysilane.

Particulate fillers may also employed in the polymer composition. When employed, particulate fillers typically constitute from about 5 wt. % to about 60 wt. %, in some embodiments from about 10 wt. % to about 50 wt. %, and in some embodiments, from about 15 wt. % to about 45 wt. % of the polymer composition. Various types of particulate fillers may be employed as is known in the art. Clay minerals, for instance, may be particularly suitable for use in the present invention. Examples of such clay minerals include, for instance, talc (Mg$_3$Si$_4$O$_{10}$(OH)$_2$), halloysite (Al$_2$Si$_2$O$_5$(OH)$_4$), kaolinite (Al$_2$Si$_2$O$_5$(OH)$_4$), illite ((K, H$_3$O)(Al,Mg,Fe)$_2$ (Si,Al)$_4$O$_{10}$[(OH)$_2$,(H$_2$O)]), montmorillonite (Na,Ca)$_{0.33}$(Al,Mg)$_2$Si$_4$O$_{10}$(OH)$_2$.nH$_2$O), vermiculite ((MgFe,Al)$_3$(Al,Si)$_4$O$_{10}$(OH)$_2$.4H$_2$O), palygorskite ((Mg, Al)$_2$Si$_4$O$_{10}$(OH).4(H$_2$O)), pyrophyllite (Al$_2$Si$_4$O$_{10}$(OH)$_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite (KAl$_2$(AlSi$_3$)O$_{10}$(OH)$_2$), biotite (K(Mg,Fe)$_3$(AlSi$_3$)O$_{10}$(OH)$_2$), phlogopite (KMg$_3$(AlSi$_3$)O$_{10}$(OH)$_2$), lepidolite (K(Li,Al)$_2$-3(AlSi$_3$)O$_{10}$(OH)$_2$), glauconite (K,Na)(Al,Mg,Fe)$_2$(Si,Al)$_4$O$_{10}$(OH)$_2$), etc., as well as combinations thereof.

A disulfide compound may also be employed in certain embodiments that can undergo a chain scission reaction with the polyarylene sulfide during melt processing to lower its overall melt viscosity. When employed, disulfide compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

wherein R$^3$ and R$^4$ may be the same or different and are hydrocarbon groups that independently include from 1 to about 20 carbons. For instance, R$^3$ and R$^4$ may be an alkyl, cycloalkyl, aryl, or heterocyclic group. In certain embodiments, R$^3$ and R$^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. R$^3$ and R$^4$ may also include reactive functionality at terminal end(s) of the disulfide compound. For example, at least one of R$^3$ and R$^4$ may include a terminal carboxyl group, hydroxyl group, a substituted or non-substituted amino group, a nitro group, or the like. Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid (or 2,2'-dithiobenzoic acid), dithioglycolic acid, α,α'-dithiodilactic acid, β,β'-dithiodilactic acid, 3,3'-dithiodipyridine, 4,4'dithiomorpholine, 2,2'-dithiobis (benzothiazole), 2,2'-dithiobis(benzimidazole), 2,2'-dithiobis(benzoxazole), 2-(4'-morpholinodithio)benzothiazole, etc., as well as mixtures thereof.

If desired, a nucleating agent may also be employed to further enhance the crystallization properties of the composition. One example of such a nucleating agent is an inorganic crystalline compound, such as boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), and so forth. Boron nitride (BN) has been found to be particularly beneficial when employed in the polymer composition of the present invention. Boron nitride exists in a variety of different crystalline forms (e.g., h-BN—hexagonal, c-BN—cubic or spharlerite, and w-BN—wurtzite), any of which can generally be employed in the present invention. The hexagonal crystalline form is particularly suitable due to its stability and softness.

Still other additives that can be included in the polymer composition may include, for instance, antimicrobials, pigments (e.g., carbon black), antioxidants, stabilizers, surfactants, waxes, solid solvents, and other materials added to enhance properties and processability. Lubricants, for instance, may be employed in the polymer composition. Examples of such lubricants include fatty acids esters, the salts thereof, esters, fatty acid amides, organic phosphate esters, and hydrocarbon waxes of the type commonly used as lubricants in the processing of engineering plastic materials, including mixtures thereof. Suitable fatty acids typically have a backbone carbon chain of from about 12 to about 60 carbon atoms, such as myristic acid, palm itic acid, stearic acid, arachic acid, montanic acid, octadecinic acid, parinric acid, and so forth. Suitable esters include fatty acid esters, fatty alcohol esters, wax esters, glycerol esters, glycol esters and complex esters. Fatty acid amides include fatty primary amides, fatty secondary amides, methylene and ethylene bisamides and alkanolamides such as, for example, palmitic acid amide, stearic acid amide, oleic acid amide, N,N'-ethylenebisstearamide and so forth. Also suitable are the metal salts of fatty acids such as calcium stearate, zinc stearate, magnesium stearate, and so forth; hydrocarbon waxes, including paraffin waxes, polyolefin and oxidized polyolefin waxes, and microcrystalline waxes. Particularly suitable lubricants are acids, salts, or amides of stearic acid, such as pentaerythritol tetrastearate, calcium stearate, or N,N'-ethylenebisstearamide. When employed, the lubricant(s) typically constitute from about 0.05 wt. % to about 1.5 wt. %, and in some embodiments, from about 0.1 wt. % to about 0.5 wt. % (by weight) of the polymer composition.

II. Method for Forming the Polymer Composition

The manner in which the polymers are combined may vary as is known in the art. For instance, the raw materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the polyaryletherketone and liquid crystalline polymer may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 200° C. to about 500° C., and in some embodiments, from about 250° C. to about 400° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

The resulting polymer composition may exhibit a relatively high glass transition temperature. For example, the glass transition temperature of the polymer composition may be about 50° C. or more, in some embodiments about 70° C. or more, in some embodiments from about 80° C. to about 260° C., and in some embodiments, from about 90° C. to about 200° C. The melting temperature may also be about 300° C. to about 400° C., in some embodiments from about 310° C. to about 390° C., and in some embodiments, from about 330° C. to about 385° C. The glass transition and melting temperatures may be determined as is well known in the art using differential scanning calorimetry ("DSC"), such as determined by ISO Test No. 11357-1:2016.

Once formed, the polymer composition may be shaped into a variety of different products, such as fibers, molded articles (e.g., injection molded, compression molded, etc.), films, pultruded parts (e.g., profiles, rods, etc.), and so forth. For example, the polymer composition, which possesses the unique combination of high flowability and good mechanical properties, may be particularly well suited for parts having a small dimensional tolerance. Such parts, for example, generally contain at least one micro-sized dimension (e.g., thickness, width, height, etc.), such as from about 500 micrometers or less, in some embodiments from about 50 to about 450 micrometers, and in some embodiments, from about 100 to about 400 micrometers. In one particular embodiment, for instance, an electronic component, such as a connector or compact camera module, may incorporate the part. Some examples of products that may contain such electronic components include, for instance, cellular telephones, laptop computers, small portable computers (e.g., ultraportable computers, netbook computers, and tablet computers), wrist-watch devices, pendant devices, headphone and earpiece devices, media players with wireless communications capabilities, handheld computers (also sometimes called personal digital assistants), remote controllers, global positioning system (GPS) devices, handheld gaming devices, battery covers, speakers, camera modules, integrated circuits (e.g., SIM cards), housings for electronic devices, electrical controls, circuit breakers, switches, power electronics, printer parts, etc.

The present invention may be better understood with reference to the following examples.

Test Methods

UL94: A specimen is supported in a vertical position and a flame is applied to the bottom of the specimen. The flame is applied for ten (10) seconds and then removed until flaming stops, at which time the flame is reapplied for another ten (10) seconds and then removed. Two (2) sets of five (5) specimens are tested. The sample size is a length of 125 mm, width of 13 mm, and thickness of 0.4 or 1.6 mm. The two sets are conditioned before and after aging. For unaged testing, each thickness is tested after conditioning for 48 hours at 23° C. and 50% relative humidity. For aged testing, five (5) samples of each thickness are tested after conditioning for 7 days at 70° C.

| Vertical Ratings | Requirements |
|---|---|
| V-0 | Specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame. |
| V-1 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens must not drip flaming particles that ignite the cotton. No specimen can have glowing combustion remain for longer than 60 seconds after removal of the test flame. |
| V-2 | Specimens must not burn with flaming combustion for more than 30 seconds after either test flame application. Total flaming combustion time must not exceed 250 seconds for each set of 5 specimens. Specimens must not burn with flaming or glowing combustion up to the specimen holding clamp. Specimens can drip flaming particles that ignite the cotton. No specimen can have glowing combustion remain for longer than 60 seconds after removal of the test flame. |

Melt Viscosity: The melt viscosity (Pa-s) may be determined in accordance with ISO Test No. 11443:2005, such as with a Dynisco LCR7001 capillary rheometer. The rheometer orifice (die) may, for example, have a diameter of 1 mm, length of 20 mm, L/D ratio of 20:1, and an entrance angle of 180°. The diameter of the barrel was 9.55 mm+0.005 mm and the length of the rod was 233.4 mm. The melt viscosity is typically determined at a temperature at least 15° C. above the melting temperature and at a shear rate of 1000 s$^{-1}$ or 1,200 s$^{-1}$. For example, the melt viscosity of the polymer composition is typically determined at a temperature of about 380° C. and shear rate of 1,000 s$^{-1}$. On the other hand, the melt viscosity is typically determined at a temperature of about 400° C. and shear rate of 1,000 s$^{-1}$ for neat polyaryletherketones (e.g., PEEK) and at a temperature of about 310° C. and shear rate of 1,200 s$^{-1}$ for neat polyarylene sulfides.

Glass Transition and Melting Temperatures: The glass transition temperature ("Tg") and melting temperature ("Tm") may be determined by differential scanning calorimetry ("DSC") as is known in the art. For semi-crystalline and crystalline materials, the melting temperature is the differential scanning calorimetry (DSC) peak melt temperature as determined by ISO Test No. 11357-2:2016. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation at Break: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 1 or 5 mm/min.

Flexural Modulus, Flexural Stress, and Flexural Break Strain: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength: Notched Charpy properties may be tested according to ISO Test No. ISO 179-1: 2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Glass Transition and Melting Temperatures: The glass transition ("Tg") may be determined by differential scanning calorimetry ("DSC") as is known in the art and described in ISO Test No. 11357-1:2016. The melting temperature ("Tm") may also be determined as the differential scanning calorimetry (DSC) peak melt temperature. Under the DSC procedure, samples may be heated and cooled at 20° C. per minute as stated in ISO Standard 10350 using DSC measurements conducted on a TA Q2000 Instrument.

EXAMPLE 1

A polymer composition was formed a blend of 70 wt. % polyetheretherketone ("PEEK") and 30 wt. % glass fibers ("Glass Fiber 1"). The PEEK polymer had a melt viscosity of about 137 Pa-s, as determined in accordance with ISO 11443:2005 at a temperature of 400° C. and shear rate of 1,000 s$^{-1}$. The glass fibers ("Glass Fiber 1") were flat, chopped glass fiber strands (aspect ratio of 4) available from Taishan. The compounding was carried out in a 25-mm twin-screw extruder at a melting temperature of 380° C. and throughput rate of 30 lb/hr.

EXAMPLE 2

A polymer composition was formed as described in Example 1, except that the composition also contained a polyphenylene sulfide resin ("PPS 1"), which is commercially available from Celanese and has a melt viscosity of about 100 to 240 Pa-s, as determined in accordance with ISO 11443:2005 at a temperature of 310° C. and shear rate of 1,200 s$^{-1}$. The resulting composition contained 63 wt. % PEEK, 7 wt. % PPS, and 30 wt. % glass fibers. The compounding was carried out in a 25-mm twin-screw extruder at a melting temperature of 380° C. and throughput rate of 30 lb/hr.

EXAMPLE 3

A polymer composition was formed as described in Example 1, except that the composition also contained a polyphenylene sulfide resin ("PPS 2"), which is commercially available from Celanese and has a melt viscosity of about 220 to 340 Pa-s, as determined in accordance with ISO 11443:2005 at a temperature of 310° C. and shear rate of 1,200 s$^{-1}$. The resulting composition contained 59 wt. % PEEK, 11 wt. % PPS, and 30 wt. % glass fibers. The compounding was carried out in a 25-mm twin-screw extruder at a melting temperature of 380° C. and throughput rate of 30 lb/hr.

EXAMPLE 4

A polymer composition was formed as described in Example 3, except that the composition contained 63 wt. % PEEK, 7 wt. % PPS, and 30 wt. % glass fibers.

EXAMPLE 5

A polymer composition was formed as described in Example 3, except that the composition contained 67 wt. % PEEK, 3 wt. % PPS, and 30 wt. % glass fibers.

EXAMPLE 6

A polymer composition was formed as described in Example 3, except that the glass fibers ("Glass Fiber 2") are flat, chopped glass fiber strands (aspect ratio of 4) available from available from Nippon Electric.

EXAMPLE 7

A polymer composition was formed as described in Example 3, except that the composition did not contain glass fibers. As a result, the composition contained only 93 wt. % PEEK and 7 wt. % PPS.

Test Results

Injection molded parts were formed from the compositions of Examples 1-6 and tested for thermal and mechanical properties as described herein. The results are set forth below.

| Example No. | 1 | 2 | 3 | 4 | 5 | 6 | 7 |
|---|---|---|---|---|---|---|---|
| PEEK | 70 | 63 | 59 | 63 | 67 | 59 | 93 |
| PPS 1 | — | 7 | — | — | — | — | — |
| PPS 2 | — | — | 11 | 7 | 3 | 11 | 7 |
| Glass Fiber 1 | 30 | 30 | 30 | 30 | 30 | — | — |
| Glass Fiber 2 | — | — | — | — | — | 30 | — |
| Melt Viscosity (Pa-s) at 1,000 s$^{-1}$ and 380° C. | 287.1 | 214.5 | 188.6 | 217.7 | 247.8 | 222.6 | 180.6 |
| Flex Modulus (MPa) | 11244 | 11609 | 11788 | 11671 | 11437 | 11149 | 3836 |
| Flex Strength (MPa) | 269.48 | 260.4 | 250.68 | 255.17 | 265.22 | 241.84 | 124.26 |
| Flex Strain (%) | 2.72 | 2.46 | 2.29 | 2.38 | 2.57 | 2.27 | — |
| Tensile Modulus (MPa) | 11137 | 11740 | 11971 | 11720 | 11478 | 12045 | 3640 |
| Tensile Strength (MPa) | 173.92 | 172.2 | 166.77 | 172.94 | 176.27 | 162.79 | 97.94* |
| Break Strain (%) | 2.09 | 1.88 | 1.73 | 1.9 | 2.04 | 1.76 | 46.18 |
| Charpy Notched Impact Strength (kJ/m$^2$) | 9.5 | 9.1 | 7.8 | 9 | 9.4 | 7 | 5.4 |
| Unnotched Charpy Impact Strength (kJ/m$^2$) | 52.7 | 45.8 | 38.7 | 45.6 | 49.6 | 44 | — |
| DTUL@1.8 MPa (° C.) | 323 | 319 | 305 | 316 | 320 | 297.5 | — |
| UL94 Rating at Thickness of 1.6 mm (unaged) | V-0 | V-0 | V-0 | V-0 | V-0 | V-0 | — |
| UL94 Rating at Thickness of 0.4 mm (aged) | V-0 | V-0 | V-0 | V-0 | V-0 | V-0 | — |

*Tensile strength at yield.

Injection molded parts formed from Examples 1 and 6 were also subjected to hydrolytic stability testing by placing the parts in a pressure vessel containing an aqueous solution (20% by volume of water) and then heating within the pressure vessel at a temperature of 150° C., pressure of 60 psi, and for a time period of 2,000 hours. The samples were tested for tensile strength after 500 hours, 1,000 hours, 1,500 hours, and 2,000 hours of these conditions. The results are set forth below.

| Exposure Time at 150° C. (hours) | Example 6 (Ratio of Tensile Strength to Initial Tensile Strength) | Example 1 (Ratio of Tensile Strength to Initial Tensile Strength) |
|---|---|---|
| 500 | 0.67 | 0.73 |
| 1,000 | 0.66 | 0.62 |
| 1,500 | 0.70 | 0.68 |
| 2,000 | 0.73 | 0.68 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A polymer composition comprising at least one polyaryletherketone, at least one polyarylene sulfide, and a plurality of reinforcing fibers, wherein the polyaryletherketone constitutes from about 40 wt. % to about 80 wt. % of the polymer composition and the polyarylene sulfide constitutes from about 0.5 wt. % to about 15 wt. % of the polymer composition, wherein the composition has a melt viscosity of 250 Pa-s or less as determined in accordance with ISO Test No. 11443:2005 at a shear rate of 1,000 seconds$^{-1}$ and temperature of about 380° C., wherein the composition exhibits a deflection temperature under load of about 280° C. or more as determined in accordance with ISO Test No. 75-2:2013 at a specified load of 1.8 MPa, and wherein the composition exhibits a tensile strength of from 100 to about 400 MPa as determined in accordance with ISO Test No. 527:2012 at 23° C.

2. The polymer composition of claim 1, wherein the polyaryletherketone has a glass transition temperature of from about 130° C. to about 230° C.

3. The polymer composition of claim 1, wherein the polyaryletherketone has a melt viscosity of about 150 Pa-s or more, as determined in accordance with ISO Test No. 11443:2005 at a shear rate of 1,000 s$^{-1}$ and temperature of about 400° C.

4. The polymer composition of claim 1, wherein the polyaryletherketone contains a moiety having the structure of Formula (I) and/or Formula (II):

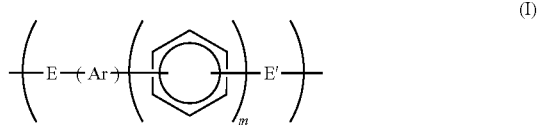

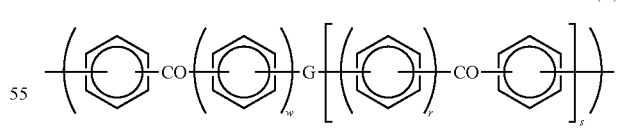

wherein,
m and r are independently zero or a positive integer;
s and w are independently zero or a positive integer;
E and E' are independently an oxygen atom or a direct link;
G is an oxygen atom, a direct link, or —O-Ph-O— where Ph is a phenyl group; and
Ar is one of the following moieties (i) to (vi), which is bonded via one or more of phenyl moieties to adjacent moieties:

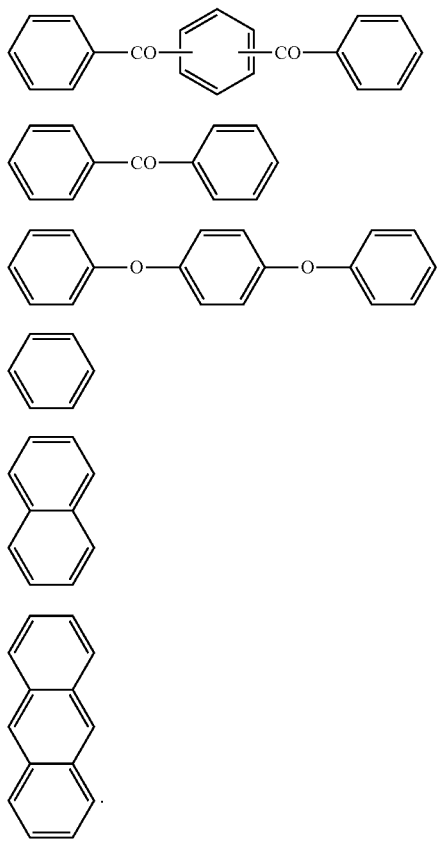

(i)
(ii)
(iii)
(iv)
(v)
(vi)

5. The polymer composition of claim 4, wherein the polyaryletherketone contains a repeat unit of the following general Formula (III):

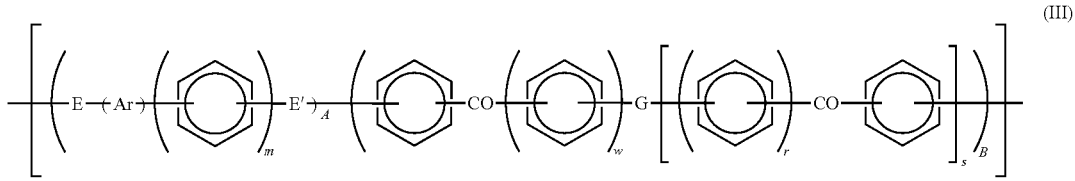

wherein,
A and B are independently 0 or 1.

6. The polymer composition of claim 4, wherein the polyaryletherketone contains a repeat unit of the following general Formula (IV):

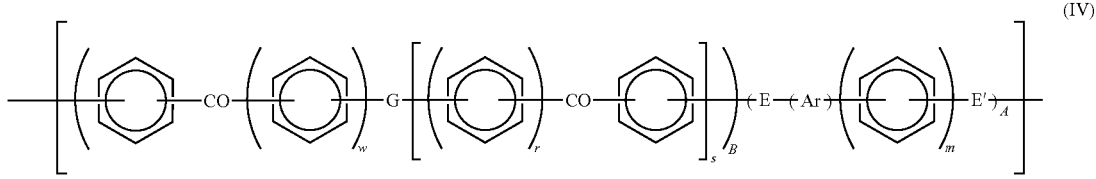

wherein,
A and B are independently 0 or 1.

7. The polymer composition of claim 1, wherein the polyaryletherketone is polyetheretherketone, polyetherketone, polyetherketoneketone, polyetherketoneetherketoneketone, polyetheretherketoneketone, polyether-diphenyl-ether-ether-diphenyl-ether-phenyl-ketone-phenyl, or a blend or copolymer thereof.

8. The polymer composition of claim 1, wherein the polyarylene sulfide is a polyphenylene sulfide.

9. The polymer composition of claim 1, wherein the polyarylene sulfide has a melt viscosity of about 150 Pa-s or les, as determined in accordance with ISO Test No. 11443: 2005 at a shear rate of 1,200 seconds$^{-1}$ and temperature of about 310° C.

10. The polymer composition of claim 1, wherein the polyarylene sulfide is present in an amount of from about 1 to about 60 parts per 100 parts by weight of the polyaryletherketone.

11. The polymer composition of claim 1, wherein the polyarylene sulfide constitutes from about 2 wt. % to about 15 wt. % of the polymer composition.

12. The polymer composition of claim 1, wherein the reinforcing fibers have an aspect ratio of from about 1.5 to about 10, the aspect ratio being defined as the cross-sectional width of the fibers divided by the cross-sectional thickness of the fibers.

13. The polymer composition of claim 1, wherein the reinforcing fibers include glass fibers.

14. The polymer composition of claim 1, wherein the reinforcing fibers are present in an amount of from about 20 to about 80 parts per 100 parts by weight of the polyaryletherketone.

15. The polymer composition of claim 1, wherein the reinforcing fibers constitute from about 5 wt. % to about 60 wt. % of the polymer composition.

16. The polymer composition of claim 1, wherein the polyaryletherketone constitutes from about 45 wt. % to about 75 wt. % of the polymer composition.

17. The polymer composition of claim 1, wherein the ratio of the melt viscosity of the polymer composition to the melt viscosity of the polyaryletherketone is about 0.98 or less.

18. The polymer composition of claim 1, further comprising an organosilane compound.

19. The polymer composition of claim 1, wherein after being submerged in an aqueous solution containing 20% by volume of water and heated at a temperature of 150° C. for 2,000 hours, the composition exhibits a hydrolytic tensile strength, wherein the ratio of the hydrolytic tensile strength to the tensile strength prior to being submerged in the aqueous solution is about 0.5 or more.

20. The polymer composition of claim 1, wherein the composition exhibits a V0 rating as determined in accordance with UL94 at a thickness of 1.6 mm.

21. The polymer composition of claim 1, wherein the composition exhibits a V0 rating as determined in accordance with UL94 at a thickness of 0.4 mm after conditioning for 48 hours at 23° C. and 50% relative humidity.

22. A shaped part comprising the polymer composition of claim 1.

23. The shaped part of claim 22, wherein the shaped part is injection molded.

24. An electronic component comprising the shaped part of claim 22.

25. The polymer composition of claim 1, wherein the composition is free of an organosilane compound.

* * * * *